(12) United States Patent  (10) Patent No.: US 7,707,812 B2
Cheung  (45) Date of Patent: May 4, 2010

(54) COMPACT LAWN MOWER (76) Inventor: Edward Kwok-Yen Cheung, 205 W. Kelly, Newbury Park, CA (US) 91320

( * ) Notice: Subject to any disclaimer, the term of this patent is extended or adjusted under 35 U.S.C. 154(b) by 0 days.

(21) Appl. No.: 12/017,871

(22) Filed: Jan. 22, 2008

(65) Prior Publication Data
US 2009/0183482 A1 Jul. 23, 2009

(51) Int. Cl.
A01D 34/00 (2006.01)
(52) U.S. Cl. ......................... 56/17.5; 56/15.8
(58) Field of Classification Search ................. 56/17.5, 56/320, 1, 16.7, 12.7, 11.9, 15.8
See application file for complete search history.

(56) References Cited

U.S. PATENT DOCUMENTS

| 2,557,598 | A |   | 6/1951  | Daggett            |          |
|-----------|---|---|---------|--------------------|----------|
| 4,065,913 | A |   | 1/1978  | Fisher et al.      |          |
| 4,077,191 | A |   | 3/1978  | Pittinger, Sr. et al. |       |
| 4,132,280 | A | * | 1/1979  | Jones et al.       | 180/19.3 |
| 4,307,563 | A |   | 12/1981 | Fuelling, Jr. et al. |        |
| 4,341,060 | A | * | 7/1982  | Lowry et al.       | 56/17.5  |
| 4,531,350 | A |   | 7/1985  | Huthmacher         |          |
| 4,688,376 | A | * | 8/1987  | Wolfe, Sr.         | 56/16.7  |
| 4,703,613 | A |   | 11/1987 | Raymond            |          |
| 4,879,869 | A | * | 11/1989 | Buckendorf, Jr.    | 56/12.7  |
| 5,020,308 | A |   | 6/1991  | Braun et al.       |          |
| 5,226,284 | A |   | 7/1993  | Meehleder          |          |
| 5,261,215 | A | * | 11/1993 | Hartz et al.       | 56/11.9  |
| 5,297,379 | A |   | 3/1994  | Smith              |          |
| 5,307,612 | A |   | 5/1994  | Tomiyama et al.    |          |
| 5,488,818 | A |   | 2/1996  | Powers et al.      |          |
| 5,636,504 | A | * | 6/1997  | Kaley et al.       | 56/1     |
| 5,862,655 | A | * | 1/1999  | Altamirano et al.  | 56/12.1  |
| 5,894,715 | A | * | 4/1999  | Braun et al.       | 56/11.9  |
| 5,970,693 | A |   | 10/1999 | Ciaglo             |          |
| 6,510,677 | B1|   | 1/2003  | Grumberg et al.    |          |
| 6,708,473 | B2|   | 3/2004  | Nicolay et al.     |          |
| 2004/0093840 | A1 | * | 5/2004 | Velke et al.    | 56/15.8  |

FOREIGN PATENT DOCUMENTS

DE  297 07 231 U1  8/1998
DE  201 15 438 U1  3/2002

* cited by examiner

Primary Examiner—Árpád Fábián-Kovács
(74) Attorney, Agent, or Firm—Daniel P. Dooley; Fellers, Snider, et al.

(57) ABSTRACT

In an exemplary embodiment, a compact lawn mower that includes at least a shroud positioned a fixed distance from a lawn, by a common rear axle extended between and supported by a pair of rear wheels, is provided. The exemplary embodiment further includes a motor adjustment member confined within and supported by the shroud. The motor adjustment member interacts with a motor, which includes a cutting member attached to a motor shaft of the motor. In the exemplary embodiment, by manipulating the motor adjustment member, the height of the cutting member relative to the surface is set. That is, the motor adjustment member is rotated in a first direction to move the motor closer to the lawn, and in the opposite direction to move the motor further from the lawn, allowing the grass to be cut to a desired length, while the shroud remains a fixed distance from the lawn.

16 Claims, 8 Drawing Sheets

COMPACT LAWN MOWER

FIELD OF THE INVENTION

This invention relates to lawn cutting devices, and in particular, but not by way of limitation, to a compact lawn mower.

BACKGROUND

As the popularity of condominiums, duplexes, row houses, and town houses have increased, the amount of lawn typically associated with these types of housing units have tended to decrease. With the decrease in the amount of lawn square footage, traditional lawn mowers prove to be cumbersome and ill-suited for small stands of grass. Additionally, as government agencies begin to move toward the elimination of gasoline powered lawn mowers, to help curb pollution, market pressures continue to demand improvements in energy saving, reduced pollution, and pollution free lawn mowers. Accordingly, challenges remain and a need persists for improvements in methods and apparatuses for use in accommodating effective and efficient deployment of energy saving, reduced pollution, and pollution free lawn mowers.

SUMMARY OF THE INVENTION

In accordance with a plurality of preferred embodiments, a compact lawn mower includes at least a shroud positioned a fixed distance from a surface by a rear axle, which is supported by a pair of rear wheels. Preferably, the shroud encloses and confines a motor adjustment member, which is supported by a cover housing. The cover housing preferably encloses a top portion of the shroud and supports an adjustment knob, which manipulates the motor adjustment member. The motor adjustment member communicates with a motor that provides a cutting member. In a preferred embodiment, the motor adjustment member is rotated in a first direction to move the motor closer to the lawn, and in the opposite direction to move the motor further from the lawn, resulting in the grass being cut at a desired length, within a range of predetermined lengths.

A preferred embodiment further includes a pair of front wheels mounted on opposing ends of a common front axle, a steering tongue enclosing the common axle and disposed between and adjacent to the pair of front wheels, and a pivot mechanism pivotally securing an attachment member of the steering tongue to the shroud. Preferably, a push handle that includes a pair of rotatable connecting members that are each attached to the common front axle and positioned adjacent opposing ends of the steering tongue is further included in the preferred embodiment. The pair of rotatable connecting members are further disposed between a corresponding wheel of the pair of front wheels and a corresponding end of the opposing ends of the steering tongue. During operation of the lawn mower, the front wheels preferably pivot into misalignment relative to the rear wheels to turn the lawn mower in response to an applied steering force.

The preferred embodiment further includes a motor housing enclosing the motor, wherein the motor housing provides a height adjustment member communicating with the motor adjustment member to facilitate the vertical translation of the motor relative to the shroud, which remains a fixed distance off the surface.

These and various other features and advantages that characterize the claimed invention will be apparent upon reading the following detailed description and upon review of the associated drawings.

DETAILED DESCRIPTION OF A PREFERRED EMBODIMENT

Detailed descriptions of the preferred embodiments are provided herein. It is to be understood, however, that the present invention may be embodied in various forms. Various aspects of the invention may be inverted, or changed in reference to specific part shape and detail, part location, or part composition. Therefore, specific details disclosed herein are not to be interpreted as limiting, but rather as a basis for the claims and as a representative basis for teaching one skilled in the art to employ the present invention in virtually any appropriately detailed system, structure or manner.

Figures 1, 1A:
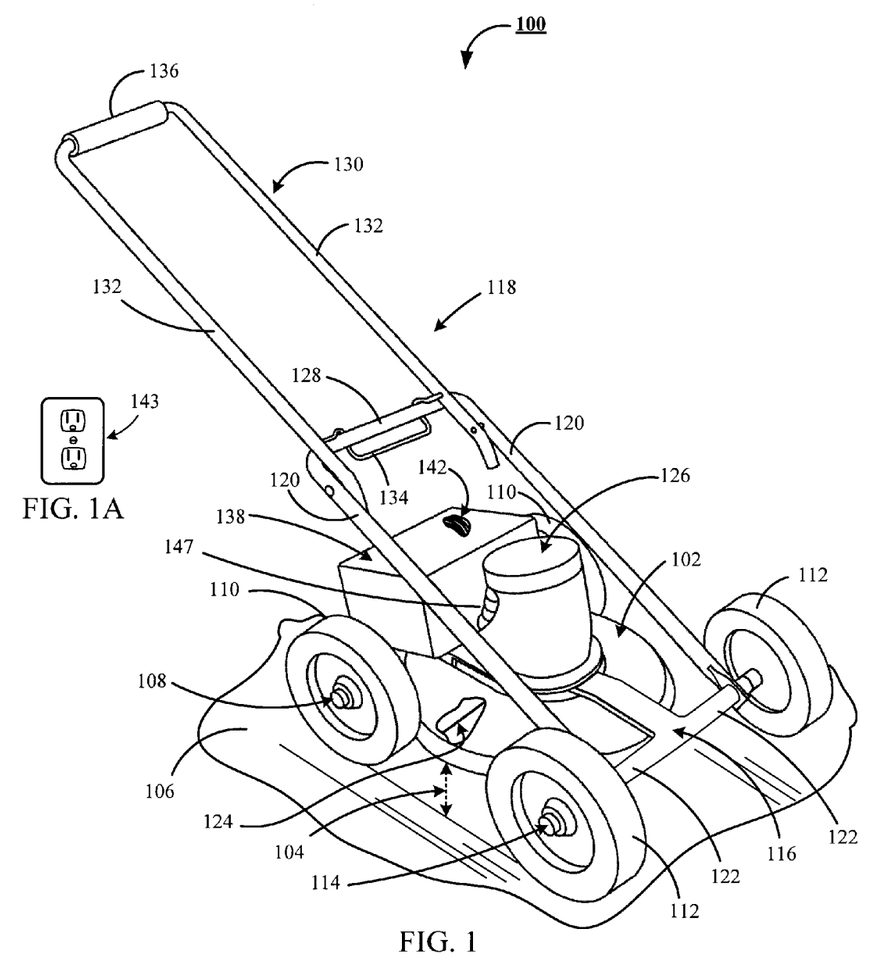
FIG. 1 shows a partial cut away perspective view in elevation of an inventive compact lawn mower of the present invention.

Reference will now be made in detail to one or more examples of the invention depicted in the figures. Each example is provided by way of explanation of the invention, and not meant as a limitation of the invention. FIG. 1 shows a preferred embodiment of an inventive compact lawn mower 100 that preferably includes a shroud 102 positioned a fixed distance 104 from a surface 106 by a rear axle 108 supported by a pair of rear wheels 110. The preferred embodiment further includes a pair of front wheels 112 mounted on opposing ends of a common front axle 114, a steering tongue 116 enclosing the common axle and disposed between and adjacent to the pair of front wheels 112, and a push handle 118 that includes at least a pair of rotatable connecting members 120. Preferably, each connecting member 120 is attached to the common front axle 114 and positioned adjacent opposing ends of the steering tongue 116, while being disposed between a corresponding wheel of the pair of front wheels 112 and a corresponding end 122 of the opposing ends of the steering tongue 116.

By maintaining the shroud 102 a fixed distance 104 from the surface 106, air flow between the shroud 102 and the surface 106 can be maintained within a predetermined range even when cutting member 124 is set to different cutting heights. In a preferred embodiment, the cutting height of the cutting member 124 is determined via the manipulation of a motor adjustment member 126, which will be disclosed in greater detail below, raises and lowers the motor relative to the surface 106, while leaving the shroud 102 the fixed distance 104 from the surface 106. In a preferred embodiment, the shroud 102 is formed from a polymer such as a highly impact resistant ABS of type disclosed in U.S. Pat. No. 6,407,163, but may be constructed from alternate impact resistant polymers, non-metallic composite materials such as carbon fiber composites, and metallic materials, including aluminum.

The push handle 118 further preferably further includes a bridge portion 128 disposed between and supporting the pair of rotatable connecting members 120, an extension handle 130 with a pair of connecting legs 132 pivotally secured to a corresponding rotatable connecting member of the pair of connecting members 120. In the preferred embodiment, the push handle 118 further includes a locking member 134 disposed between and attached to the pair of connecting legs 132 for rotation about the bridge portion 128. Preferably upon rotation of the locking member 134 in a first direction, the locking member 134 lockingly attaches to the bridge portion 128 to maintain each of the pair of connecting legs 132 in a position which extends a push bar 136 of the extension handle 130 in a direction which maximizes the distance between the push bar 136 and the common front axle 114.

Figure 2:
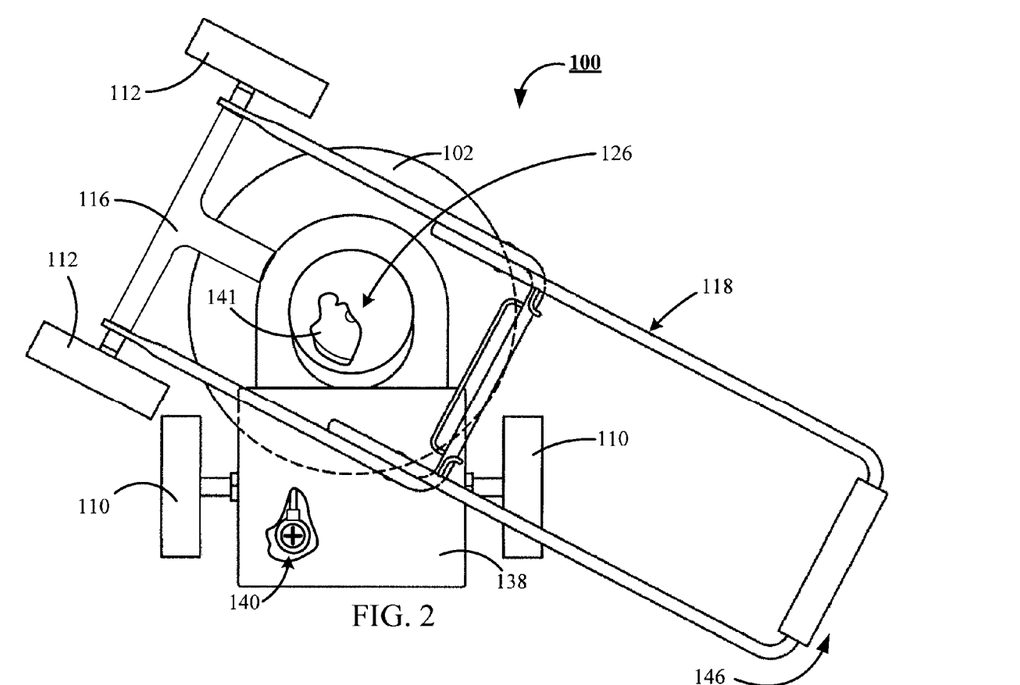
FIG. 2 illustrates a partial cut away top plan view of the inventive compact lawn mower of FIG. 1.

FIG. 2 shows the inventive compact lawn mower 100 includes an energy source housing 138, which in a preferred embodiment houses a rechargeable battery 140, i.e., a DC power source. In an exemplary embodiment, the rechargeable battery 140 is configured for powering a DC motor 141 (shown in cutaway), which in a first exemplary embodiment is a brushless DC motor, while in a second exemplary embodiment is a stepper motor.

In an alternate preferred embodiment, the energy source housing 138 houses a coiled AC electrical cord 142 (of FIG. 1). the AC electrical cord 142 interacts with AC power 143 (of FIG. 1A) to operate an AC motor 147 (of FIG. 1).

In further preferred embodiments the energy source housing 138 houses a fuel tank 144 (of FIG. 3), which in a first exemplary embodiment is configured for confinement of fossil fuels. In a second exemplary embodiment, the fuel tank 144 is configured for confinement of natural gas, and in a third exemplary embodiment the fuel tank is configured for confinement of ethanol. Regardless of the fuel type, the fuel tank 144 confines the fuel and supplies the fuel to a corresponding internal combustion engine 145.

FIG. 2 further shows that the steering tongue 116 maintains the pair of front wheels 112 a predetermined fixed distance from the edge of the shroud 102. By maintaining the pair of front wheels 112 a predetermined fixed distance from the edge of the shroud 102, when a steering force 146 is applied to the push handle 118, the pair of front wheels 112 pivot into misalignment relative to the rear wheels 110 to turn the inventive compact lawn mower 100 in response to the applied steering force 146. By providing the pair of front wheels 112 with the ability to, in unison, pivot into misalignment relative to the rear wheels 110, the inventive compact lawn mower 100 delivers a superior ability to navigate in confined areas.

Figure 3:
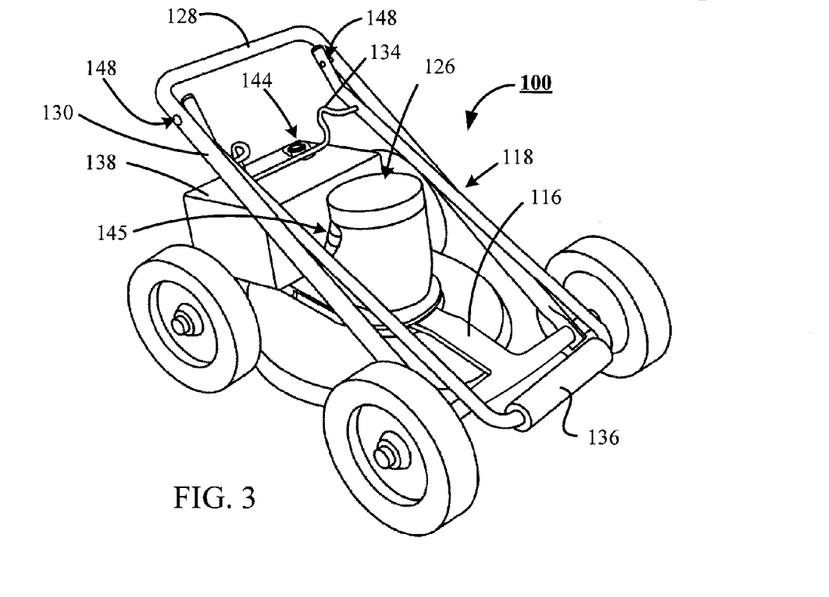
FIG. 3 depicts a partial cut away perspective view in elevation of the inventive compact lawn mower of FIG. 1 configured for storage.

FIG. 3 illustrates the ability of the push handle 118 to fold into a retracted position for storage of the inventive compact lawn mower 100 when not in use. By disengaging the locking member 134 from the bridge portion 128, the push bar 136 of the extension handle 130 has the ability to be folded about a pair of pivot pins 148, and into adjacency with the steering tongue 116.

Figure 4:
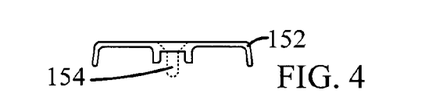
FIG. 4 portrays a cross-section view in elevation of an adjustment knob for use in adjusting the cutting height of a cutting member of a motor of the inventive compact lawn mower of FIG. 1.
Figure 9:
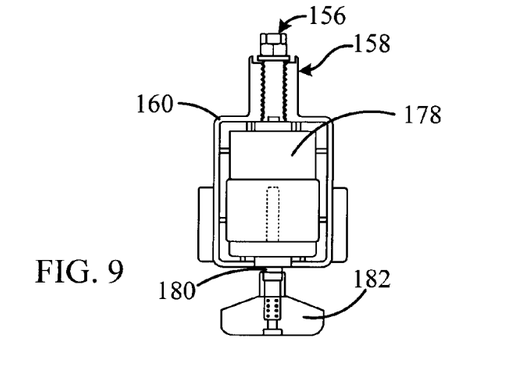
FIG. 9 portrays a cross-section view in elevation of a motor enclosed by a motor housing that includes a height adjustment member of the inventive compact lawn mower of FIG. 1.

FIGS. 4 through 9 collectively depict an exploded, cross-sectional view of a motor-shroud assembly 150. The motor adjustment member 126 (of FIG. 3) preferably includes an adjustment knob 152 supporting attachment hardware 154, as shown by FIG. 4; a translation member 156, as shown by FIG. 9, which in a preferred embodiment is a threaded shaft coupled to the attachment hardware 154, as shown by FIG. 10; and a height adjustment member 158 of a motor housing 160, as shown by FIG. 9.

Figure 5:
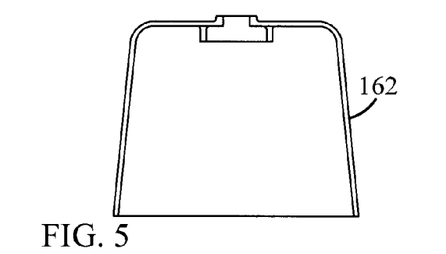
FIG. 5 reveals a cross-section view in elevation of a cover housing, which provides support for the motor of the inventive compact lawn mower of FIG.
Figure 6:
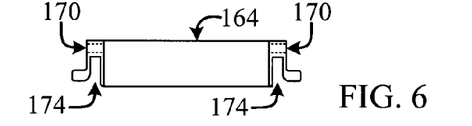
FIG. 6 shows a cross-section view in elevation of a pivot mechanism, which provides support for a steering tongue of the inventive compact lawn mower of FIG. 1.
Figure 7:
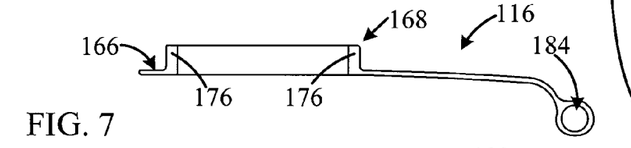
FIG. 7 illustrates a cross-section view in elevation of the steering tongue of the inventive compact lawn mower of FIG. 1.
Figure 8:
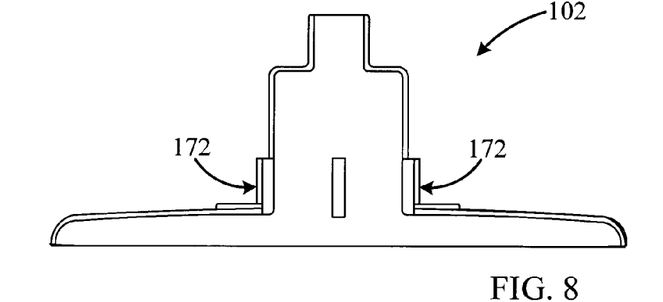
FIG. 8 depicts a cross-section view in elevation of a shroud of the inventive compact lawn mower of FIG. 1.

In a preferred embodiment, a cover housing 162, shown by FIG. 5, encloses a pivot mechanism 164 of FIG. 6, and rests atop a cover support flange 166 of an attachment member 168 of the steering tongue 116. The pivot mechanism 164 of FIG. 6 provides securement apertures 170, for use in securing the pivot mechanism 164 to a mounting plate 172 of the shroud 102 (of FIG. 8), and a pivot channel 174, configured to accept a pivot ring 176 of the attachment member 168 (of FIG. 7).

In a preferred embodiment, the motor housing 160, shown by FIG. 9, is secured to a motor 178 that provides a power shaft 180. Attached to the power shaft 180 of the preferred embodiment is a cutter hub 182 configured to accept the cutting member 124 (of FIG. 1), as shown by FIG. 10. The preferred embodiment of FIG. 10 further shows that the motor adjustment member 126 is confined by the shroud 102 and supported by the cover housing 162. By passing the attachment hardware 154 through the adjustment knob 152, and securing the attachment hardware 154 to the translation member 156 (which is preferably threaded into the height adjustment member 158 of the motor housing 160), the motor 178 becomes supported by the cover housing 162, and coupled to the motor adjustment member 126 for sliding communication with the shroud 102.

Figure 10:
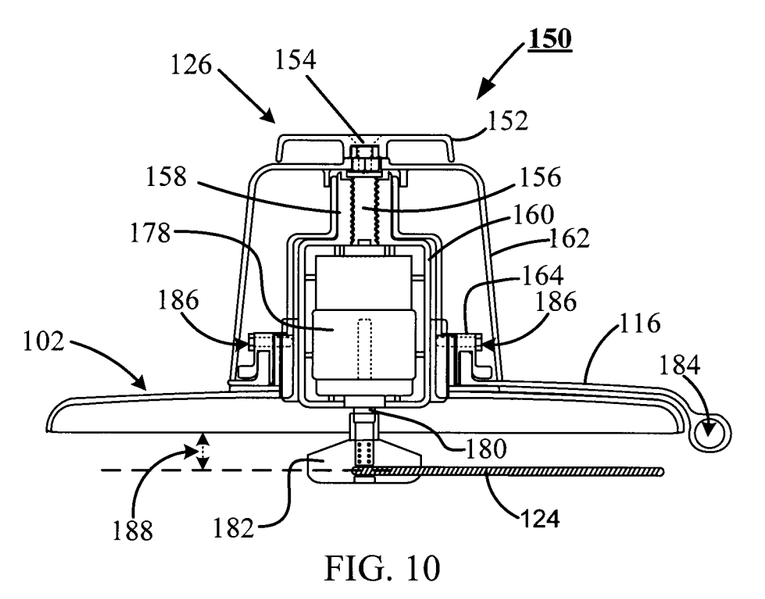
FIG. 10 reveals a cross-section view in elevation of the motor in its full up position, relative to the shroud, of the inventive compact lawn mower of FIG. 1.

FIG. 10 further shows the steering tongue 116 provides an axle aperture 184 through which the common front axle 114 (of FIG. 1) passes. Accordingly, the common front axle 114 supports the steering tongue 116 from below, while the pivot mechanism 164 (secured to the shroud 102 by securement hardware 186) constrains the steering tongue 116 from above for rotation of the steering tongue 116 about the shroud 102, and with the height adjustment member 158 in its full-up position, the cutting member 124 is positioned at its minimum cutting depth 188.

Figure 11:
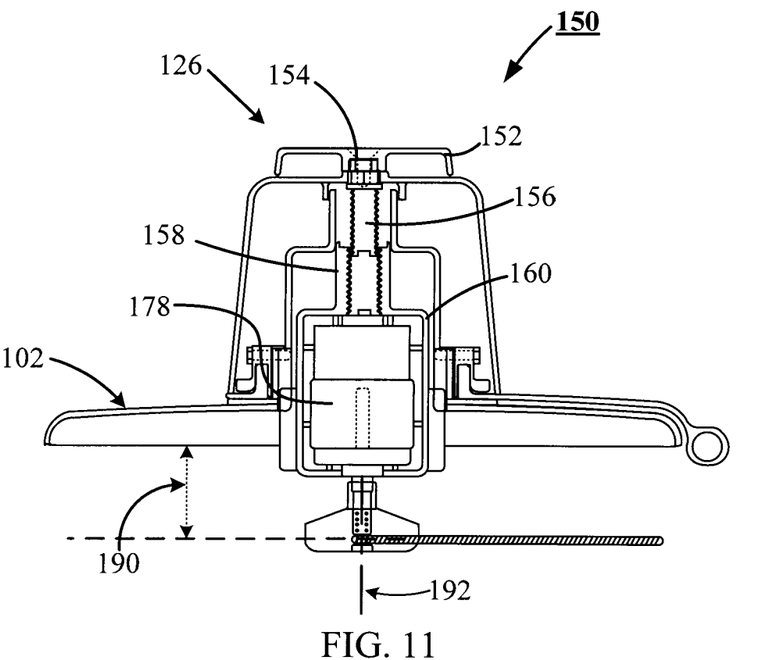
FIG. 11 shows a cross-section view in elevation of the motor in its full down position, relative to the shroud, of the inventive compact lawn mower of FIG. 1.

FIG. 11 depicts the height adjustment member 158 in its full-down position, which positions the cutting member 124 at its maximum cutting depth 190. As can be seen by comparing FIGS. 10 and 11, with the cutting member 124 coupled to the motor 178 via the cutter hub 182, a cutting height of the cutting member 124 relative to the surface 106 (of FIG. 1) is set by manipulation of the motor adjustment member 126 to fix a vertical position of the motor 178 relative to the shroud 102. By rotating the adjustment knob 152 of the motor adjustment member 126 in a first direction, the motor 178 travels in a first vertical direction, relative to the shroud 102, and by rotating the adjustment knob 152 in an opposite second direction, the motor 178 travels in a second and opposite vertical direction, relative to the shroud 102.

When the motor 178 is engaged, or activated, the power shaft 180 rotates about an axis of rotation 192, which in turn causes the cutting member 124 to rotate about the axis of rotation 192. In a preferred embodiment, the cutting member 124 is formed from a metallic, flexible cable. However, as those skilled in the art will appreciate, the cutting member 124 may be formed from a variety of alternate materials, such as polymer filaments, carbon fiber composites, rigid polymers, ceramics, a composite, or any of a number of metallic materials. Additionally, the cutting member may take the form of a rigid member, semi-rigid member, or a flexible member without deviating from the scope of the present invention.

In a preferred embodiment, the motor 178 is a battery powered DC motor. However, as those skilled in the art will radially recognize, a battery powered DC motor is easily replaced by an AC motor, a stepper motor, or an internal combustion engine, without degrading the functionality of the inventive compact lawn mower 100 (of FIG. 1). It will also be recognized that alternative motor technologies utilize alternate energy sources. That is, the utilization of an AC motor would most naturally be accompanied by the use of AC power; the use of a DC motor, or stepper motor would most naturally be accompanied by the use of DC power; and the use of an internal combustion engine would most naturally be accompanied by the use of fossil fuels, natural gas, ethanol, or a blended liquid fuel.

Figure 12:
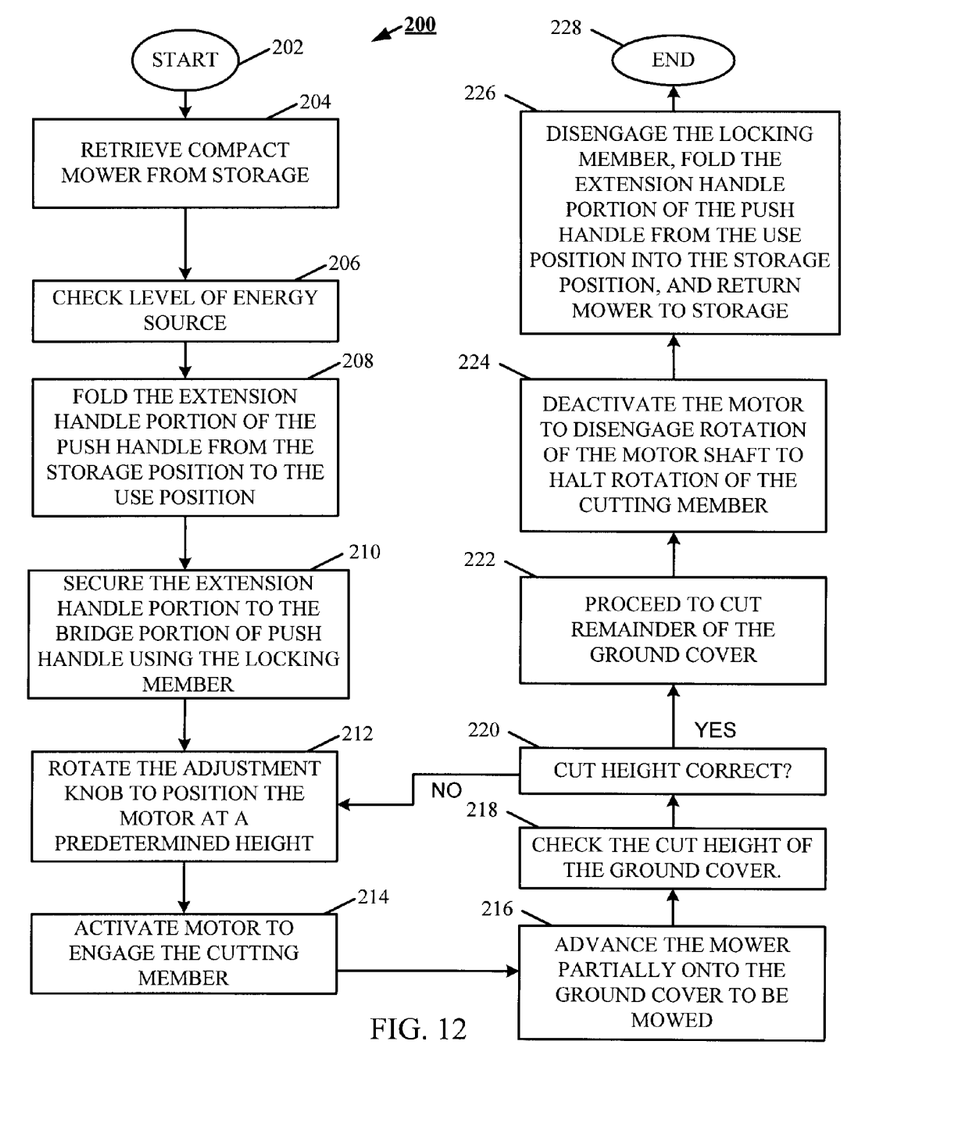
FIG. 12 illustrates a flow chart of a method using the inventive compact lawn mower of FIG. 1.

FIG. 12 illustrates a flow chart 200, showing process steps of a method for utilizing an inventive compact lawn mower (such as 100). The method commences at start process step 202 and proceeds to process step 204 with retrieving the inventive compact lawn mower from storage. At process step 206, the level of the energy source is checked. Following an affirmation that the level of available energy is sufficient to proceed, at process step 208, an extension handle (such as 130) of a push handle (such as 118) is folded from a storage position to a use position.

At process step 210, the extension handle is secured to a bridge portion (such as 128) of the push handle using a locking member (such as 134). At process step 212, an adjustment knob (such as 152) of an adjustment member (such as 126) is rotated to position a motor (such as 178) at a predetermined height. At process step 214, the motor is activated to engage a cutting member (such as 124), and at process step 216, the mower is advanced onto the ground cover to be mowed. At process step 218, the cut height of the ground cover is checked, and if the cutting height is determined to be incorrect at process step 220, the method returns to process step 212 and continues from there with a readjustment of the motor to a predetermined height. However, if the cut height of the ground cover checked at process step 218 is determined to be correct at process step 220, the process proceeds to process step 222 with the cutting of the remaining ground cover.

At process step 224, the motor is deactivated to disengage rotation of a motor shaft (such as 180) to halt rotation of the cutting member. At process step 226, the locking member is disengaged from the bridge portion of the push handle, the extension handle folded from a use position to a storage position, the mower is returned to storage, and the process concludes at end process step 228.

Figure 13:
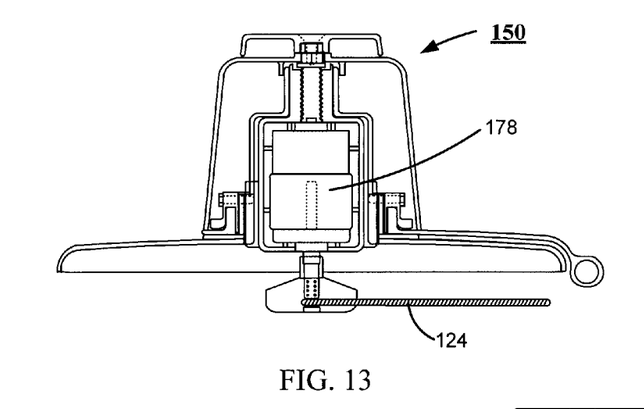
FIG. 13 reveals a cross-section view in elevation of the motor in its full up position, relative to the shroud, of the inventive compact lawn mower of FIG. 1.
Figure 14:
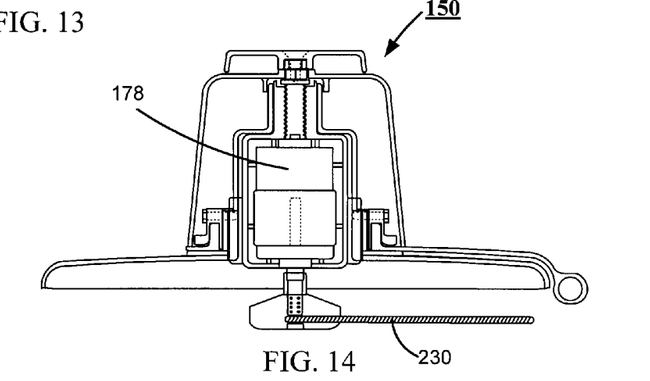
FIG. 14 illustrates a cross-section view in elevation of the motor in its full up position, relative to the shroud, of the inventive compact lawn mower of FIG. 1.
Figure 15:
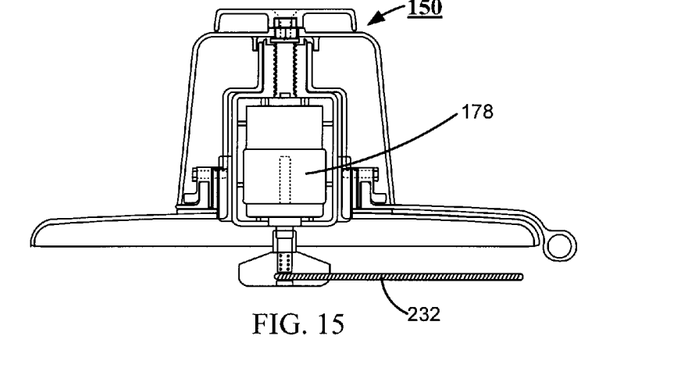
FIG. 15 shows a cross-section view in elevation of the motor in its full up position, relative to the shroud, of the inventive compact lawn mower of FIG. 1.
Figure 16:
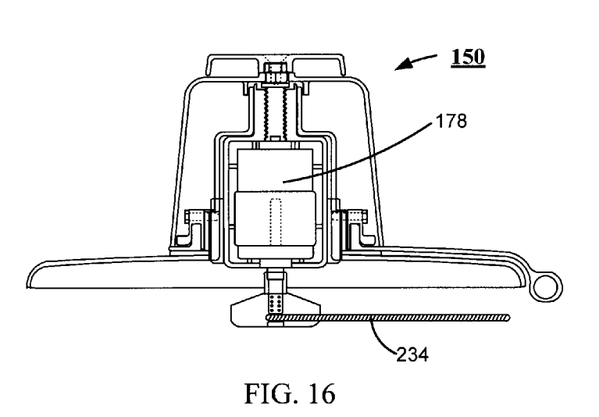
FIG. 16 depicts a cross-section view in elevation of the motor in its full up position, relative to the shroud, of the inventive compact lawn mower of FIG. 1.

In a first exemplary embodiment, shown by FIG. 13, the motor-shroud assembly 150, which includes a motor 178, supports and operates the cutting member 124 formed from a cable. In a second exemplary embodiment shown by FIG. 14, the motor-shroud assembly 150 supports and operates the cutting member 230 formed from a filament. In a third exemplary embodiment shown by FIG. 15, the motor-shroud assembly 150 supports and operates the cutting member presented in the form of a polymer blade 232. In a fourth exemplary embodiment shown by FIG. 16, the motor-shroud assembly 150 supports and operates the cutting member presented in the form of a rigid blade 234.

Figure 17:
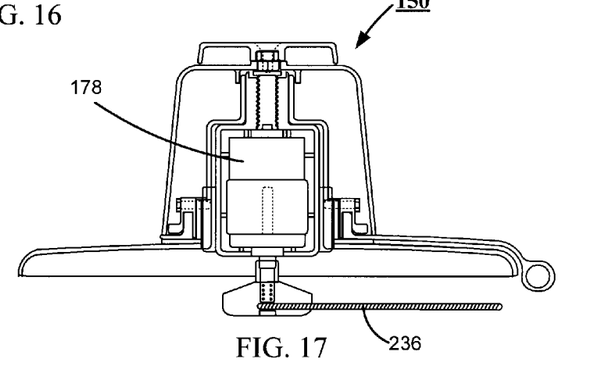
FIG. 17 portrays a cross-section view in elevation of the motor in its full up position, relative to the shroud, of the inventive compact lawn mower of FIG. 1.
Figure 18:
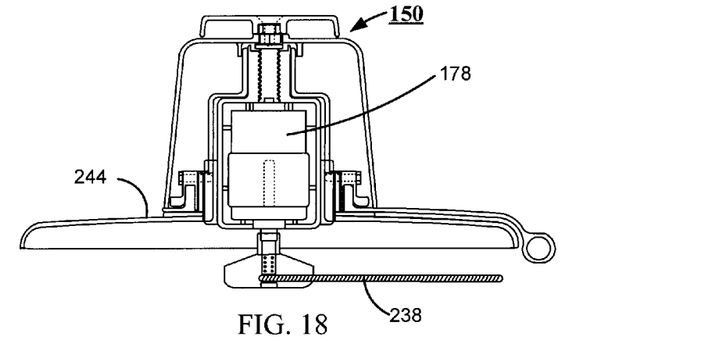
FIG. 18 reveals a cross-section view in elevation of the motor in its full up position, relative to the shroud, of the inventive compact lawn mower of FIG. 1.
Figure 19:
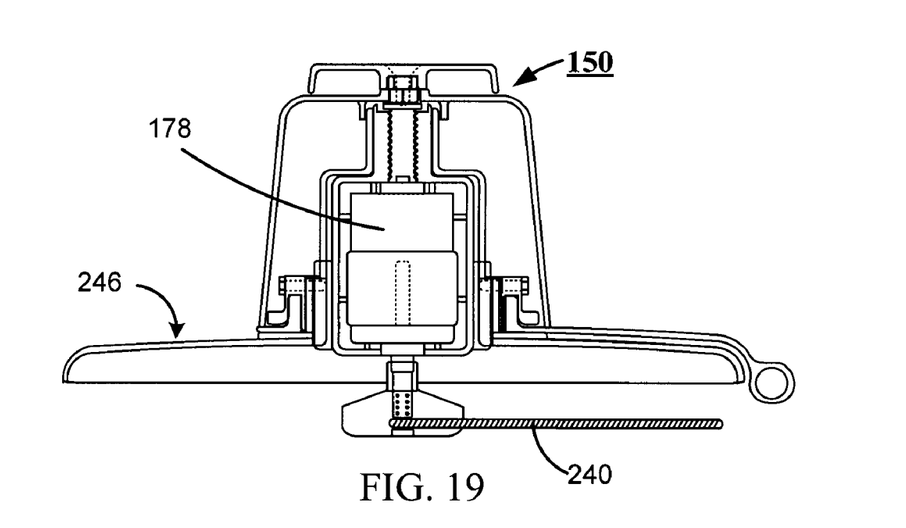
FIG. 19 presents a cross-section view in elevation of the motor in its full up position, relative to the shroud, of the inventive compact lawn mower of FIG. 1.
Figure 20:
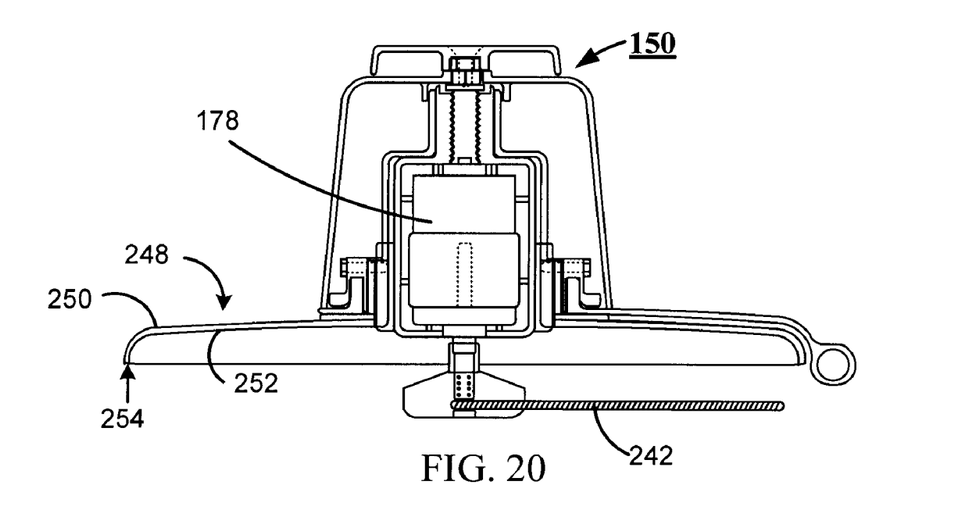
FIG. 20 is a cross-section view in elevation of the motor in its full up position, relative to the shroud, of the inventive compact lawn mower of FIG. 1.

FIG. 17 is a first alternate exemplary embodiment in which the motor-shroud assembly 150, which includes a motor 178, supports and operates the cutting member that takes the form of a mower blade 236 formed from a metal. In a second alternate exemplary embodiment shown by FIG. 18, the motor-shroud assembly 150 supports and operates the mower blade 238 formed from a ceramic, and the shroud 242 is formed from an impact resistant polymer. In a third alternate exemplary embodiment shown by FIG. 19, the motor-shroud assembly 150 supports and operates the mower blade presented in the form of a composite mower blade 240, and the shroud 244 is formed from a non-metallic composite. And in a fourth alternate exemplary embodiment shown by FIG. 20, the motor-shroud assembly 150 supports and operates the mower blade presented in the form of a polymer mower blade 242, and the shroud 246 is formed from a metallic.

For the purpose of the appended claims, the term shroud shall have the meaning of an enclosure that forms a continuous barrier against inadvertent intrusions into a cutting envelope of a cutting member via any pathway through the enclosure emanating from the exterior surface of the enclosure. The dimensions of the cutting envelope are established by the travel pathway of the cutting member. As further shown shown in FIG. 20, the enclosure includes an interior surface 252 adjacent the cutting envelope, and an exterior surface 250 offset from the interior surface 252 by the thickness of the material 254 used to form the enclosure.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed by the appended claims.

What is claimed is:

1. A lawn mower comprising:
   a shroud positioned a fixed distance from a surface by a rear axle supported by a pair of rear wheels;
   a motor adjustment member confined by the shroud;
   a motor in sliding communication with the shroud and communicating with the motor adjustment member;
   a cutting member coupled to the motor, wherein a cutting height of the cutting member relative to the surface is set by manipulation of the motor adjustment member to fix a vertical position of the motor relative to the shroud;
   a pair of front wheels mounted on opposing ends of a common front axle;
   a steering tongue enclosing the common axle and disposed between and adjacent to the pair of front wheels;
   a pivot mechanism pivotally securing an attachment member of the steering tongue to the shroud; and
   a push handle comprising a pair of rotatable connecting members, in which each connecting member is attached to the common front axle and positioned adjacent opposing ends of the steering tongue, while being disposed between a corresponding wheel of the pair of front wheels and a corresponding end of the opposing ends of the steering tongue, and wherein the front wheels pivot into misalignment relative to the rear wheels to turn the lawn mower in response to an applied steering force.

2. The lawn mower of claim 1, further comprising an energy source communicating with the motor and providing energy for operation of the motor.

3. The lawn mower of claim 2, further comprising a cutter hub attached to a distal end of a power shaft of the motor and offset from a bottom side of the shroud, and in which the power shaft includes an axis of rotation and wherein the cutter hub with the cutting member attached thereon rotates about the axis of rotation of the power shaft in response to the rotation of the power shaft.

4. The lawn mower of claim 3, in which the power shaft and cutter hub with attached cutting member rotate at substantially the same speed in response to the activation of the motor.

5. The lawn mower of claim 4, in which the cutting member is selected from a group consisting of a cable, a filament, a polymer blade, and a rigid blade.

6. The lawn mower of claim 5, in which the selected cutting member is a rigid polymer blade.

7. The lawn mower of claim 6, in which the motor is selected from a group consisting of an AC motor, a DC motor, a stepper motor, and an internal combustion engine.

8. The lawn mower of claim 7, in which the energy source is selected from a group consisting of AC power, DC power, fossil fuel, natural gas, and ethanol.

9. The lawn mower of claim 5, in which the selected cutting member is a filament comprising material selected from a group consisting of a polymer and a metallic.

10. The lawn mower of claim 5, in which the selected cutting member is a rigid blade comprising a material selected from a group consisting of a metal, a ceramic, and a composite.

11. The lawn mower of claim 1, in which the shroud is formed from a material selected from a group consisting of an impact resistant polymer, a non-metallic composite material, and a metallic material.

12. The lawn mower of claim 11, in which the push handle further comprises:
    a bridge portion disposed between and supporting the pair of rotatable connecting members;
    an extension handle with a pair of connecting legs, wherein each of the connecting legs is pivotally secured to a corresponding rotatable connecting member of the pair of connecting members; and
    a locking member disposed between and rotatably attached to the pair of connecting legs, wherein upon rotation of the locking member in a first direction the locking member lockingly attaches to the bridge portion to maintain each of the pair of connecting legs in a position which extends a push bar of the extension handle in a direction which maximizes the distance between the push bar and the common front axle.

13. The lawn mower of claim 12, further comprising a cutter hub with attached cutting member, the cutter hub attached to a distal end of a power shaft of the motor, offset from a bottom side of the shroud, and rotates in union with the power shaft in response to an activation of the motor.

14. The lawn mower of claim 13, further comprising an energy source communicating with the motor and providing energy for operation of the motor, and in which the power shaft and cutter hub with attached cutting member rotate at substantially the same speed in response to the activation of the motor.

15. The lawn mower of claim 14, in which said energy source is selected from a group consisting of AC power, DC power, fossil fuel, natural gas, and ethanol.

16. The lawn mower of claim 15, in which the cutting member is a mower blade comprising a material selected from a group consisting of a metal, a ceramic, a composite, and a polymer.

* * * * *